(12) United States Patent
Khan (10) Patent No.: US 11,587,004 B2
(45) Date of Patent: Feb. 21, 2023

(54) SYSTEM AND METHOD FOR PLACEMENT OPTIMIZATION OF PUBLIC ELECTRIC VEHICLE CHARGING STATIONS USING TELEMATICS DATA

(71) Applicant: Honda Motor Co., Ltd., Tokyo (JP)

(72) Inventor: Yusuf Khan, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 105 days.

(21) Appl. No.: 17/168,473

(22) Filed: Feb. 5, 2021

(65) Prior Publication Data

US 2022/0188729 A1 Jun. 16, 2022

Related U.S. Application Data

(60) Provisional application No. 63/123,649, filed on Dec. 10, 2020.

(51) Int. Cl.
| | |
|---|---|
| G06Q 10/00 | (2012.01) |
| G06Q 10/0631 | (2023.01) |
| G06Q 30/0204 | (2023.01) |
| G06F 16/248 | (2019.01) |
| G06F 16/29 | (2019.01) |
| B60L 53/64 | (2019.01) |
| G05B 13/02 | (2006.01) |

(Continued)

(52) U.S. Cl.
CPC ...... *G06Q 10/06315* (2013.01); *B60L 53/305* (2019.02); *B60L 53/64* (2019.02); *B60L 53/66* (2019.02); *G05B 13/0265* (2013.01); *G06F 16/248* (2019.01); *G06F 16/29* (2019.01); *G06Q 30/0205* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 2006/0242154 A1* | 10/2006 | Rawat | G06F 16/168 |
| 2013/0079964 A1* | 3/2013 | Sukkarie | G01C 21/3697 |
| | | | 701/1 |

(Continued)

OTHER PUBLICATIONS

"SMART Mobility-Advanced Fueling Infrastructure Capstone Report," Energy Efficiency & Renewable Energy, Jul. 2020, (hereinafter U.S. Department of Energy—DOE). (Year: 2020).*

(Continued)

*Primary Examiner* — Hafiz A Kassim
(74) *Attorney, Agent, or Firm* — Rankin, Hill & Clark LLP (57) ABSTRACT

A system and method for placement optimization of public electric vehicle charging stations using telematics data that includes receiving vehicle telematics data from a plurality of vehicles. The system and method also includes analyzing the vehicle telematics data to determine clusters of candidate locations of the public electric vehicle charging stations and selecting a subset of nodes of a fully connected graph structure that are associated with the candidate locations as optimal locations of the public electric vehicle charging stations. The system and method further include controlling an electronic computing system to present a human machine interface to present a visualization of the optimal locations of public electric vehicle charging stations to at least one party.

18 Claims, 7 Drawing Sheets

(51) Int. Cl.
*B60L 53/66* (2019.01)
*B60L 53/30* (2019.01)
*G06Q 50/26* (2012.01)

(56) References Cited

U.S. PATENT DOCUMENTS

| | | | |
|---|---|---|---|
| 2014/0028255 A1* | 1/2014 | Brimacombe | B60L 53/16 320/109 |
| 2014/0350970 A1* | 11/2014 | Schumann, Jr. | G08G 1/096775 705/4 |
| 2014/0354227 A1* | 12/2014 | Tyagi | B60L 53/63 320/109 |
| 2018/0032928 A1* | 2/2018 | Li | G06Q 10/08 |
| 2018/0281612 A1* | 10/2018 | Perry | H02J 7/0021 |
| 2019/0212159 A1* | 7/2019 | Petersen | G06Q 30/0283 |
| 2019/0299794 A1* | 10/2019 | Sworski | B60L 53/68 |
| 2020/0031239 A1* | 1/2020 | Chae | B60L 53/65 |
| 2020/0139835 A1* | 5/2020 | Miler | B60L 53/305 |

OTHER PUBLICATIONS

"Trans-Sense: Real Time Transportation Schedule Estimation Using Smart Phones" Ali AbdelAziz, Amin Shoukry, Walid Gomaa, and Moustafa Youssef—2019 16th Annual IEEE International Conference on Sensing, Communication, and Networking (SECON) (hereinafter AbdelAziz et al.). (Year: 2019).*

Bae, Sungwoo, and Alexis Kwasinski. "Spatial and temporal model of electric vehicle charging demand." IEEE Transactions on Smart Grid 3, No. 1 (2011): 394-403.

Buekers, Jurgen, Mirja Van Holderbeke, Johan Bierkens, and Luc Int Panis. "Health and environmental benefits related to electric vehicle introduction in EU countries." Transportation Research Part D: Transport and Environment 33 (2014): 26-38.

Chen, Shuangshuang, Yue Shi, Xingyu Chen, and Feng Qi. "Optimal location of electric vehicle charging stations using genetic algorithm." In 2015 17th Asia-Pacific Network Operations and Management Symposium (APNOMS), pp. 372-375. IEEE, 2015.

Coffman, Makena, Paul Bernstein, and Sherilyn Wee. "Electric vehicles revisited: a review of factors that affect adoption." Transport Reviews 37, No. 1 (2017): 79-93.

Egbue, Ona, and Suzanna Long. "Barriers to widespread adoption of electric vehicles: An analysis of consumer attitudes and perceptions." Energy policy 48 (2012): 717-729.

Liu, Zhipeng, Fushuan Wen, and Gerard Ledwich. "Optimal planning of electric-vehicle charging stations in distribution systems." IEEE Transactions on Power Delivery 28, No. 1 (2012): 102-110.

Sierzchula, William, Sjoerd Bakker, Kees Maat, and Bert Van Wee. "The influence of financial incentives and other socio-economic factors on electric vehicle adoption." Energy Policy 68 (2014): 183-194.

Tran, Martino, David Banister, Justin DK Bishop, and Malcolm D. McCulloch. "Simulating early adoption of alternative fuel vehicles for sustainability." Technological Forecasting and Social Change 80, No. 5 (2013): 865-875.

Bian, Caiyun, Hailong Li, Fredrik Wallin, Anders Avelin, Lu Lin, and Zhixin Yu. "Finding the optimal location for public charging stations—a GIS-based MILP approach." Energy Procedia 158 (2019): 6582-6588.

Ester, Martin, Hans-Peter Kriegel, Jörg Sander, and Xiaowei Xu. "A density-based algorithm for discovering clusters in large spatial databases with noise." In Kdd, vol. 96, No. 34, pp. 226-231. 1996.

Franke, Thomas, Isabel Neumann, Franziska Bühler, Peter Cocron, and Josef F. Krems. "Experiencing range in an electric vehicle: Understanding psychological barriers." Applied Psychology 61, No. 3 (2012): 368-391.

Fredriksson, Henrik, Mattias Dahl, and Johan Holmgren. "Optimal placement of charging stations for electric vehicles in large-scale transportation networks." Procedia Computer Science 160 (2019): 77-84.

Gopalakrishnan, Ragavendran, Arpita Biswas, Alefiya Lightwala, Skanda Vasudevan, Partha Dutta, and Abhishek Tripathi. "Demand prediction and placement optimization for electric vehicle charging stations." arXiv preprint arXiv:1604.05472 (2016).

Lam, Albert YS, Yiu-Wing Leung, and Xiaowen Chu. "Electric vehicle charging station placement: Formulation, complexity, and solutions." IEEE Transactions on Smart Grid 5, No. 6 (2014): 2846-2856.

Li, Yanhua, Jun Luo, Chi-Yin Chow, Kam-Lam Chan, Ye Ding, and Fan Zhang. "Growing the charging station network for electric vehicles with trajectory data analytics." In 2015 IEEE 31st International Conference on Data Engineering, pp. 1376-1387. IEEE, 2015.

Little, John DC. "A proof for the queuing formula." Operations Research 9, No. 3 (1961): 383-387.

Luo, Chao, Yih-Fang Huang, and Vijay Gupta. "A consumer behavior based approach to multi-stage EV charging station placement." In 2015 IEEE 81st Vehicular Technology Conference (VTC Spring), pp. 1-6. IEEE, 2015.

Mersky, Avi Chaim, Frances Sprei, Constantine Samaras, and Zhen Sean Qian. "Effectiveness of incentives on electric vehicle adoption in Norway." Transportation Research Part D: Transport and Environment 46 (2016): 56-68.

Vazifeh, Mohammad M., Hongmou Zhang, Paolo Santi, and Carlo Ratti. "Optimizing the deployment of electric vehicle charging stations using pervasive mobility data." Transportation Research Part A: Policy and Practice 121 (2019): 75-91.

Wagner, Sebastian, Tobias Brandt, and Dirk Neumann. "Smart city planning-developing an urban charging infrastructure for electric vehicles." (2014).

* cited by examiner

SYSTEM AND METHOD FOR PLACEMENT OPTIMIZATION OF PUBLIC ELECTRIC VEHICLE CHARGING STATIONS USING TELEMATICS DATA

CROSS-REFERENCE TO RELATED APPLICATION

This application claims priority to U.S. Provisional Application Ser. No. 63/123,649 filed on Dec. 10, 2020, which is expressly incorporated herein by reference.

BACKGROUND

One of the considerable challenges of the coming decade will be how to transition to clearer more efficient sources of energy. One of the notable emerging markets that serves this purpose includes fully battery powered electric vehicles. Traditional internal combustion engine vehicles have had over a century to establish the infrastructure necessary for commercial use. While the electric vehicle market share has been steadily increasing there remains some demand side barriers to overcome. Notably, one of the deterrent factors commonly attributed to discouraging consumers from switching to electric vehicles is the lack of supporting charging infrastructure. For example, in many instances, current consumer confidence with respect to purchasing and adopting electric vehicles may be curtailed based on a perception that electric vehicle charging stations may not be found to support a perceived driving distance.

In one study, a concept of "range-anxiety" is captured where participant drivers self-reported that desirable electric vehicle ranges were disproportionate to the observed driving of the participants. This phenomenon is consistent with findings that suggest that the psychological barriers for electric vehicle drivers cannot be understood in terms of absolute range but are better understood as "comfortable range" which considers a remaining range buffer and availability of mobility resources such as charging station infrastructure. Accordingly, in order for electric vehicle technology to make a significant impact in the clean energy movement, infrastructure may need to be provided that supports the broad usage of electric vehicle technology and perceived electric vehicle ranges.

BRIEF DESCRIPTION

According to one aspect, a computer-implemented method for placement optimization of public electric vehicle charging stations using telematics data that includes receiving vehicle telematics data from a plurality of vehicles. The computer-implemented method also includes analyzing the vehicle telematics data to determine clusters of candidate locations of the public electric vehicle charging stations. Candidate locations are output as nodes within a fully connected graph structure. The computer-implemented method additionally includes selecting a subset of nodes of the fully connected graph structure that are associated with the candidate locations as optimal locations of the public electric vehicle charging stations. The computer-implemented method further includes controlling an electronic computing system to present a human machine interface to present a visualization of the optimal locations of the public electric vehicle charging stations to at least one party.

According to another aspect, a system for placement optimization of public electric vehicle charging stations using telematics data that includes a memory storing instructions when executed by a processor cause the processor to receive vehicle telematics data from a plurality of vehicles. The instructions also cause the processor to analyze the vehicle telematics data to determine clusters of candidate locations of the public electric vehicle charging stations. Candidate locations are output as nodes within a fully connected graph structure. The instructions additionally cause the processor to select a subset of nodes of the fully connected graph structure that are associated with the candidate locations as optimal locations of the public electric vehicle charging stations. The instructions further cause the processor to control an electronic computing system to present a human machine interface to present a visualization of the optimal locations of the public electric vehicle charging stations to at least one party.

According to yet another aspect, a non-transitory computer readable storage medium storing instructions that when executed by a computer, which includes a processor perform a method that includes receiving vehicle telematics data from a plurality of vehicles. The method also includes analyzing the vehicle telematics data to determine clusters of candidate locations of the public electric vehicle charging stations. Candidate locations are output as nodes within a fully connected graph structure. The method additionally includes selecting a subset of nodes of the fully connected graph structure that are associated with the candidate locations as optimal locations of the public electric vehicle charging stations. The method further includes controlling an electronic computing system to present a human machine interface to present a visualization of the optimal locations of the public electric vehicle charging stations to at least one party.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Figure 1:
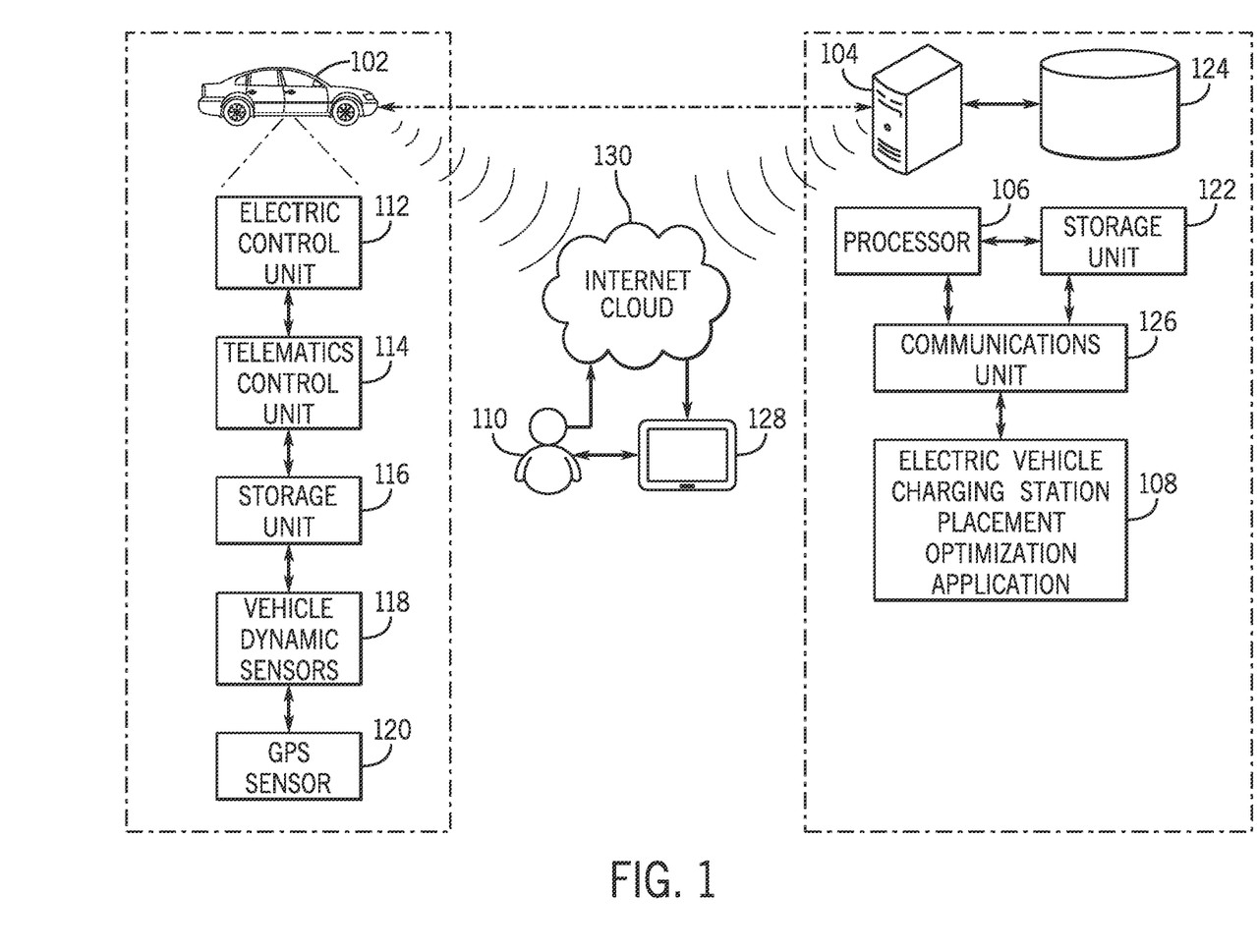
FIG. 1 is a schematic view of an exemplary operating environment for placement optimization of public electric vehicle charging stations using telematics data according to an exemplary embodiment of the present disclosure.

Referring now to the drawings, wherein the showings are for purposes of illustrating one or more exemplary embodiments and not for purposes of limiting same, FIG. 1 is a schematic view of an exemplary operating environment 100 for placement optimization of public electric vehicle charging stations (electric vehicle charging stations) using telematics data according to an exemplary embodiment of the present disclosure. The components of the environment 100, as well as the components of other systems, hardware architectures, and software architectures discussed herein, may be combined, omitted, or organized into different architectures for various embodiments.

Generally the environment 100 includes a plurality of vehicles 102 that may provide telematics data to an externally hosted server infrastructure (external server) 104. The plurality of vehicles 102 may include, but may not be limited to, electric vehicles, automobiles (cars, trucks, SUVs, vans), and the like that may be manufactured by one or more vehicle manufacturers. The external server 104 may be operably controlled by a processor 106 that may be configured to execute an electric vehicle charging station placement optimization application (EV station optimization application) 108. As discussed in more detail below, the EV station optimization application 108 may be configured to execute methods of augmenting public electric vehicle charging infrastructure planning decisions, specifically as they relate to improving electric vehicle adoption through electric vehicle charging station placement optimization.

As discussed below, the EV station optimization application 108 may be configured to execute various phases to output optimal locations (e.g., n best locations) for placement of electric vehicle charging stations. The EV station optimization application 108 may execute instructions to perform data acquisition and wrangling of granular telematics data provided by the plurality of vehicles 102 to determine geo-spatial locations of each of the plurality of vehicles 102 at one or more points of time. The EV station optimization application 108 may thereby identify candidate locations of electric vehicle charging stations.

The EV station optimization application 108 may be configured to perform cluster feature engineering. The cluster feature engineering may be completed by utilization of an unsupervised machine learning method to complete charging station placement clustering that may be based on traffic density patterns. The charging station placement clustering may be completed for one or more particular regions (e.g., metropolitan areas, city, counties, etc.). The EV station optimization application 108 may complete an operations research queuing model and linear inter programming selection optimization to identify the optimal locations for placement of electric vehicle charging stations with respect to a charging station supplier's budget and the utility of each location for electric vehicle drivers.

The EV station optimization application 108 may provide a visualization of the optimal locations. In particular, the EV station optimization application 108 may operably control one or more electronic display devices of one or more computing systems 128 to present a human machine interface (HMI) that provides a visualization of optimal locations for placement of electric vehicle charging stations. The HMI may be accessible by stakeholders 110 that may include, but may not be limited to, electric vehicle station owners, electric vehicle station operators, electric vehicle supply equipment providers, and the like.

The HMI may provide a portable and interactive graphic interface that may be utilized to determine optimal locations for stakeholders 110 to invest in and place electric vehicle charging stations based on likelihood of station utilization by electric vehicle operators. The optimal locations may be provided with attributes that may pertain to the locations and surrounding areas, that may include, but may not be limited to, inbound traffic behavior, traffic patterns, demand timings, locality based demand response pricing schemes, local event descriptions, and the like. This functionality may thereby enhance consumer confidence with respect to the adoption of electric vehicle technology since the optimal locations that are determined for placement of electric vehicle charging stations may take into account a comfortable range for driver utility which may promote higher adoption of electric vehicle technology for vehicle drivers.

With continued reference to FIG. 1, the plurality of vehicles 102 may respectively include an electronic control unit (ECU) 112 that executes one or more applications, operating systems, vehicle system and subsystem user interfaces, among others. In one or more embodiments, the ECU 112 may include a microprocessor, one or more application-specific integrated circuit(s) (ASIC), or other similar devices. The ECU 112 may also include internal processing memory, an interface circuit, and bus lines for transferring data, sending commands, and communicating with the plurality of components of each respective vehicle. The ECU 112 may also include a communication device (not shown) for sending data internally within (e.g., between one or more components) the vehicle 102 and communicating with externally hosted computing systems (e.g., external to the vehicle 102).

In one embodiment, the ECU 112 may be configured to access a storage unit 116 to execute one or more executable application files that are associated with the EV station optimization application 108. The ECU 112 may communicate with the storage unit 116 to execute the one or more applications, operating systems, vehicle system and subsystem user interfaces, and the like that are stored within the storage unit 116. In particular, the ECU 112 may be configured to access the storage unit 116 to execute one or more executable application files that are associated with the EV station optimization application 108.

The ECU 112 may be configured to execute the EV station optimization application 108 to collect location based data and to utilize a telematics control unit (TCU) 114 of each of the plurality of vehicles 102 to communicate vehicle dynamics data and geo-location data to the external server 104. The TCU 114 may be configured to collect vehicle dynamic data from vehicle dynamic sensors 118 and location based data from a GPS sensor 120 that is included within each of the plurality of vehicles 102.

In one embodiment, the vehicle dynamic sensors 118 may be configured to receive inputs from one or more vehicle systems, sub-systems, control systems, and the like. In one embodiment, the vehicle dynamic sensors 118 may be included as part of a Controller Area Network (CAN) of the vehicle 102 and may be configured to provide vehicle dynamic data to the ECU 112 to be utilized for one or more vehicle systems, sub-systems, control systems, and the like. The vehicle dynamic sensors 118 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, and the like (individual sensors not shown).

In one configuration, the vehicle dynamic sensors 118 may provide dynamic data in the form of one or more values (e.g., numeric levels) that are associated with the real-time dynamic performance of the vehicle 102 that pertain to movement of the each of the plurality of vehicles 102, vehicle positions, vehicle speed, vehicle engine data, and the like. In an exemplary embodiment, the GPS sensors 120 may be configured to determine a plurality of locational coordinates (GPS, DGPS) that may include the locations where each of the plurality of vehicles 102 are traveling. Upon determining the plurality of locational coordinates at various points in time, the GPS sensors 120 may output geo-location data that may be associated with each trip (e.g., ignition ON event until an ignition OFF event) of each vehicle to the ECU 112 and the TCU 114 of each of the plurality of vehicles 102. In some configurations, the ECU 112 may store the geo-location data for a plurality of trips during a timeframe or distance range (e.g., 1 year, 1 month, 10,000 miles) upon the storage unit 116 of each of the plurality of vehicles 102. The TCU 114 may thereby receive or retrieve the geo-location data and may communicate the geo-location data to the EV station optimization application 108.

In an exemplary embodiment, the TCU 114 of each of the plurality of vehicles 102 may be configured to wirelessly communicate vehicle telematics data that includes the vehicle dynamic data output by the vehicle dynamic sensors 118 and the geo-location data output by the GPS sensors 120 by each of the plurality of vehicles 102 to the external server 104. The TCU 114 may be configured to wirelessly connect to an internet cloud 130 to thereby communicate the vehicle telematics data to the external server 104.

In one embodiment, upon receipt of the vehicle telematics data communicated by the TCU 114 of each of the plurality of vehicles 102 by the external server 104, the EV station optimization application 108 may be configured to analyze the vehicle dynamic data to determine dwell times (e.g., parking durations) of each of the plurality of vehicles 102 at one or more particular geo-locations that may be determined based on geo-location data that is output by the GPS sensors 120 of each of the plurality of vehicles 102. The EV station optimization application 108 may be also configured to analyze the geo-location data to determine one or more geo-locations of each of plurality of vehicles 102 during one or more points in time. In one embodiment, the geo-location data may be analyzed to determine one or more geo-locations that may include destinations of each of the plurality of vehicles 102 (e.g., where each of the plurality of vehicles 102 is parked for one or more durations of time).

In an exemplary embodiment, the external server 104 may be operably controlled by a processor 106 that may be configured to execute the EV station optimization application 108. In particular, the processor 106 may be configured to execute one or more applications, operating systems, database, and the like. The processor 106 may also include internal processing memory, an interface circuit, and bus lines for transferring data, sending commands, and communicating with the plurality of components of the external server 104.

In one embodiment, the processor 106 may be operably connected to a storage unit 122 of the external server 104. Generally, the processor 106 may communicate with the storage unit 122 to execute the one or more applications, operating systems, and the like that are stored within the storage unit 122. In one embodiment, the storage unit 122 may store one or more executable application files that are associated with the EV station optimization application 108.

The storage unit 122 may be configured to store a database 124 that may be accessed and queried by the EV station optimization application 108. In one embodiment, the database 124 may be utilized to store responses to various query functions that may be executed to analyze the vehicle dynamics data and/or the geo-location data communicated to the external server 104 from the TCU 114 of each of the plurality of vehicles 102. In one configuration, a storage operation to store data within corresponding records of the database 124 may be predicated on an objective of the executed query function. The EV station optimization application 108 may be configured to perform corresponding comparisons and logical operations before storing responses associated with the executed query function.

As discussed below, the EV station optimization application 108 may analyze the vehicle dynamic data and the geo-location data by executing two query functions. A destination_collector query function may be executed to determine a number of destinations of each of the plurality of vehicles 102 during a particular period of time (e.g. 1 month). Additionally, a dwell_time_collector function may be executed to determine a dwell time of each of the plurality of vehicles 102 at one or more particular destinations. Stated differently, the dwell time may indicate parking durations of each of the plurality of vehicles 102 at particular destinations. Accordingly, the EV station optimization application 108 may store destination data and dwell time data upon respective records of the database 124 to be retrieved and further electronically analyzed to identify candidate locations that may be based on the destinations, demand, and traffic density.

With continued reference to FIG. 1, the EV station optimization application 108 may complete unsupervised learning by implementing a Density Based Spatial Clustering Applications with Noise algorithm (DBSCAN) to ensure that proximity calculations are completed with respect to the destination_collector function to thereby determine candidate locations for placement of electric vehicle charging stations.

The EV station optimization application 108 may implement DBSCAN since it is deterministic, interpretable, and scalable to large databases as it does not require every observation to reside in memory during computation. The EV station optimization application 108 may implement DBSCAN to evaluate a particular k-dimensional space (e.g., 100 mile radius of a metropolitan area) to determine a density of points within a cluster that will be higher than a density of observations outside the cluster. Accordingly, this discriminating operation to label noise makes DBSCAN useful to cluster geo-spatial data based on the destination data associated with the plurality of vehicles 102.

In an exemplary embodiment, the processor 106 of the external server 104 may also be operably connected to a communication unit 126 of the external server 104. The communication unit 126 may be configured to communicate through the internet cloud through one or more wireless communication signals that may include, but may not be limited to Bluetooth® signals, Wi-Fi signals, ZigBee signals, Wi-Max signals, and the like. In one embodiment, the communication unit 126 may be configured to connect to the internet cloud 130 to send and receive communication signals with the TCU 114 of each of the plurality of vehicles 102. In particular, the communication unit 126 may be configured to access the internet cloud 130 and receive vehicle dynamic data and geo-location data that is communicated by the TCU 114 of each of the plurality of vehicles 102. In some configurations, the communication unit 126 may be configured to access the internet cloud 130 to communicate data to one or more vehicles of the plurality of vehicles 102. Such data may be associated with one or more user interfaces of the EV station optimization application 108 to be presented to respective operators of one or more vehicles.

In one or more embodiments, the EV station optimization application 108 may be configured to utilize the communication unit 126 to communicate data through the internet cloud 130 to operably control one or more computing systems 128 present the HMI through associated electronic display devices that may be accessed by respective stakeholders 110. As discussed, the HMI may be accessible by stakeholders 110 to provide a portable, interactive visual interface that may be utilized to determine the optimal locations to place (e.g., invest, build, operate, and maintain) electric vehicle charging stations based on likelihood of station utilization.

In some embodiments, the HMI may include various user interfaces that may provide attributes that are associated with each of the determined optimal locations. Such attributes may include, but may not be limited to, inbound traffic behavior, traffic patterns, demand timings, locality based demand response pricing schemes, local event descriptions (e.g., sporting events, entertainment events, conventions, etc. that may affect traffic flow and/or charging demand), and the like. As the optimal locations that are determined for placement of electric vehicle charging stations may party be determined based on a perceived comfortable driving range for driver utility, higher adoption of electric vehicle technology for consumers may be promoted. This functionality may thereby enhance consumer confidence with respect to the adoption of electric vehicle technology.

II. The Electric Vehicle Charging Station Placement Optimization Application and Related Methods The general functionality of the EV station optimization application 108 will now be discussed in more detail with respect to exemplary methods that may be executed by the application 108. In an exemplary embodiment, the EV station optimization application 108 may be fully or partially executed by the processor 106 of the external server 104. Additionally or alternatively, the EV station optimization application 108 may be fully or partially executed by the ECU 112 of each of the plurality of vehicles 102.

The EV station optimization application 108 may utilize the TCU 114 of each of the plurality of vehicles 102 and the communication unit 126 of the external server 104 to communicate application related data between the plurality of vehicles 102 and the external server 104. Additionally, the EV station optimization application 108 may utilize the communication unit 126 to communicate application related data between the external server 104 and one or more computing systems 128 that may be utilized by respective stakeholders 110.

The EV station optimization application 108 may determine the optimal placement of electric vehicle charging stations to promote higher rates of electric vehicle consumer adoption. The application 108 takes into account an average electric vehicle driver utility ($\mu_e$) gained from the presence of a well located electric vehicle charging station which is factored by the aggregate destination demand attributes at that location. Such attributes may include dwell time and average daily inbound traffic that are determined based on destination data and dwell time data (determined based on the analysis of the vehicle dynamic data and the geo-location data provided by each of the plurality of vehicles 102). The EV station optimization application 108 may apply budget constraints and location constraints such that the stakeholders 110 may operate on a limited budget (8) and may be restricted to build electric vehicle charging stations a subset of the set of N identified candidate locations, (N'subseteqN).

The EV station optimization application 108 may thereby utilize telematics geospatial data to identify locations within a predetermined area (e.g., metropolitan area) as candidate locations based on destination demand. To derive the average electric vehicle driver utility ($\mu_i$), the application 108 may thereby consider demand characteristics at that location (dwell time, average daily visits, variance daily visits). The candidate locations may be output as nodes within a fully connected graph structure. The EV station optimization application 108 may accordingly analyze the nodes and utilize constraints to determine the |N'| optimal locations for placement of electric vehicle charging stations. The |N'| optimal locations may thereby be presented to the stakeholders 110 through the control of one or more computing systems 128 that may be utilized by respective stakeholders 110.

Figure 2:
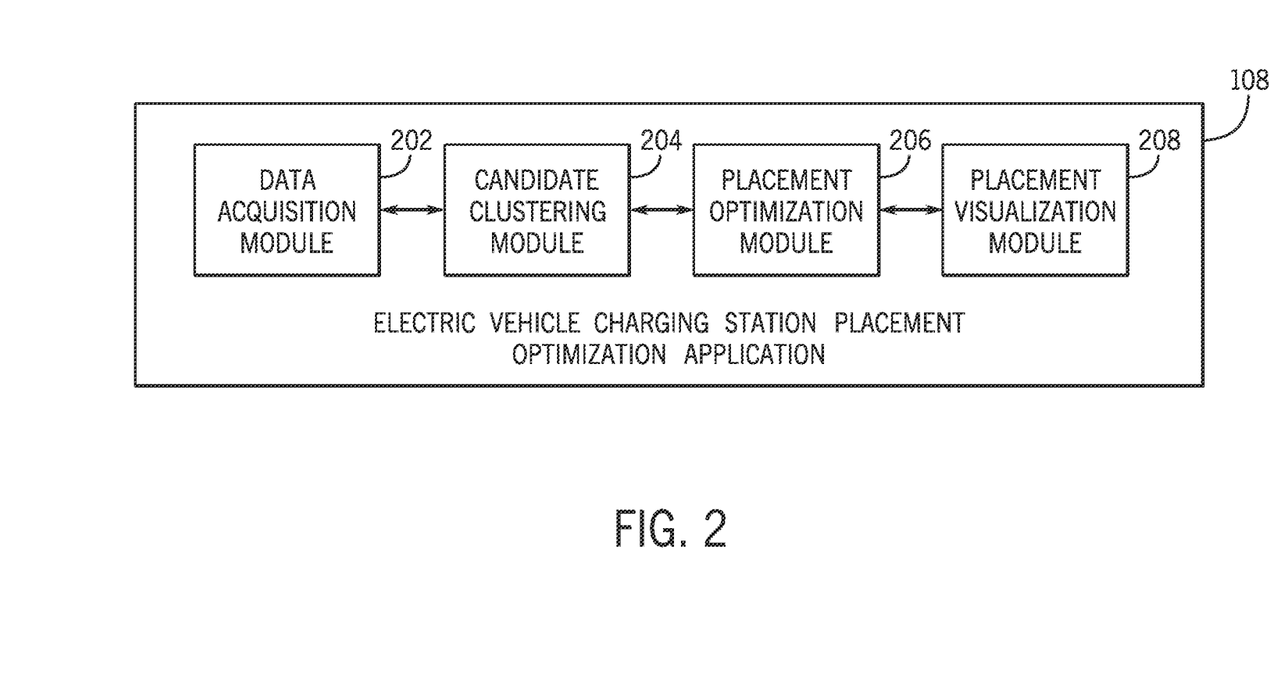
FIG. 2 is a schematic view of the modules of the EV station optimization application that may execute computer-implemented instructions for augmenting public electric vehicle charging infrastructure planning decision according to an exemplary embodiment of the present disclosure.

FIG. 2 is a schematic view of the modules 202-208 of the EV station optimization application 108 that may execute computer-implemented instructions for augmenting public electric vehicle charging infrastructure planning decisions, specifically as they relate to improving electric vehicle adoption through electric vehicle charging station placement optimization. In an exemplary embodiment, the plurality of modules 202-208 may include a data acquisition module 202, a candidate clustering module 204, a placement optimization module 206, and a placement visualization module 208. However, it is appreciated that the EV station optimization application 108 may include one or more additional modules and/or sub-modules that are included in addition to or in lieu of the modules 202-208. The functionality of the plurality of modules 202-208 of the EV station optimization application 108 will now be described in detail with reference to computer-executed methods that are executed by the EV station optimization application 108.

Figure 3:
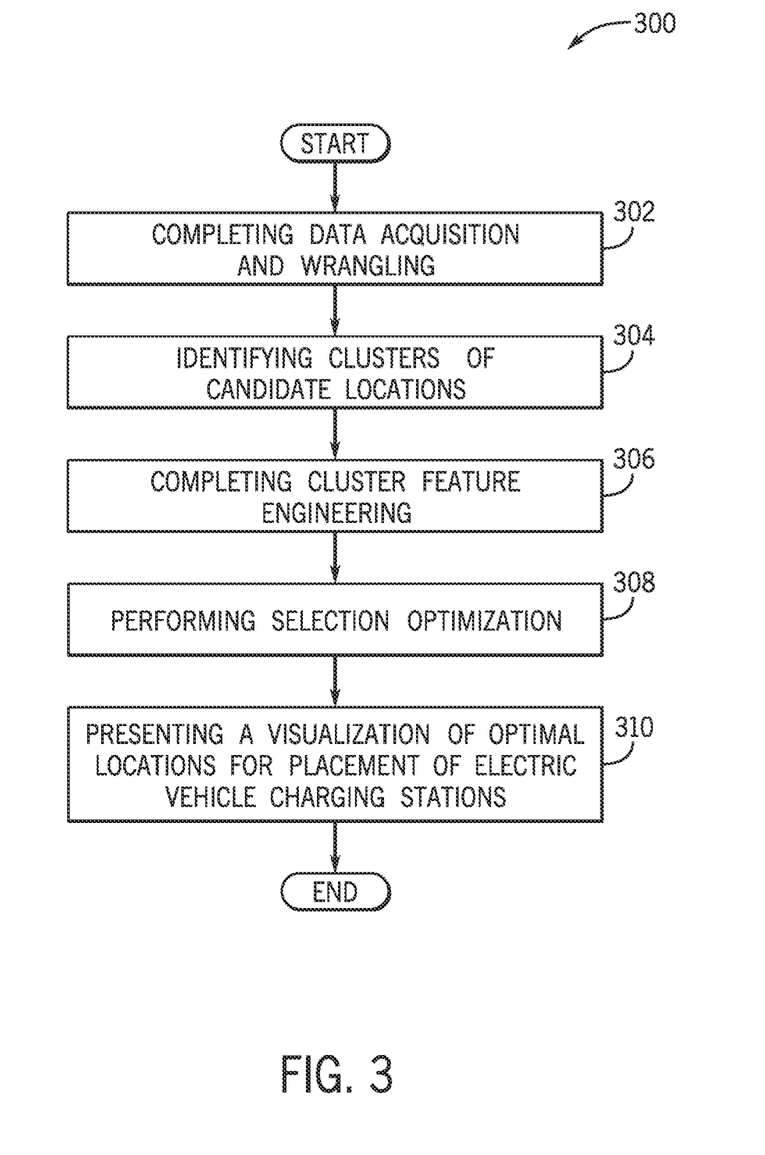
FIG. 3 is a process flow diagram of a method for augmenting public electric vehicle charging infrastructure planning decisions according to an exemplary embodiment of the present disclosure.

FIG. 3 is a process flow diagram of a method 300 for augmenting public electric vehicle charging infrastructure planning decisions according to an exemplary embodiment of the present disclosure. FIG. 3 will be described with reference to the components of FIG. 1 and FIG. 2, through it is to be appreciated that the method 300 of FIG. 3 may be used with additional and/or alternative system components. The method 300 may begin at block 302, wherein the method 300 may include completing data acquisition and wrangling.

As discussed above, the TCU 114 of each of the plurality of vehicles 102 may communicate vehicle telematics data that includes the vehicle dynamics data and geo-location data to the external server 104 through the internet cloud 130. In an exemplary embodiment, the data acquisition module 202 of the EV station optimization application 108 may be configured to execute a destination_collector query function to determine a number of destinations of each of the plurality of vehicles 102 during a particular period of time (e.g. 1 month) based on the geo-location data received from the plurality of vehicles 102. Additionally, a dwell_time_collector function may be executed to determine a dwell time of each of the plurality of vehicles 102 at one or more particular destinations based on the vehicle dynamic data received from the plurality of vehicles 102.

In one embodiment, the data acquisition module 202 may be configured to access the storage unit 122 of the external server 104 to query the database 124. The data acquisition module 202 may query the database 124 to retrieve destination data and dwell time data associated with destinations that may be located within a predetermined area (e.g., metropolitan area). For example, the data acquisition module 202 may query the database 124 to retrieve destination data and dwell time data associated with geo-location data provided by a subset of the plurality of vehicles 102 that are located within geo-spatial locations that are included within a certain distance range of one another that may be included within a particular distance radius (e.g., 100 miles) that may encompass a metropolitan area of a city.

Figure 4:
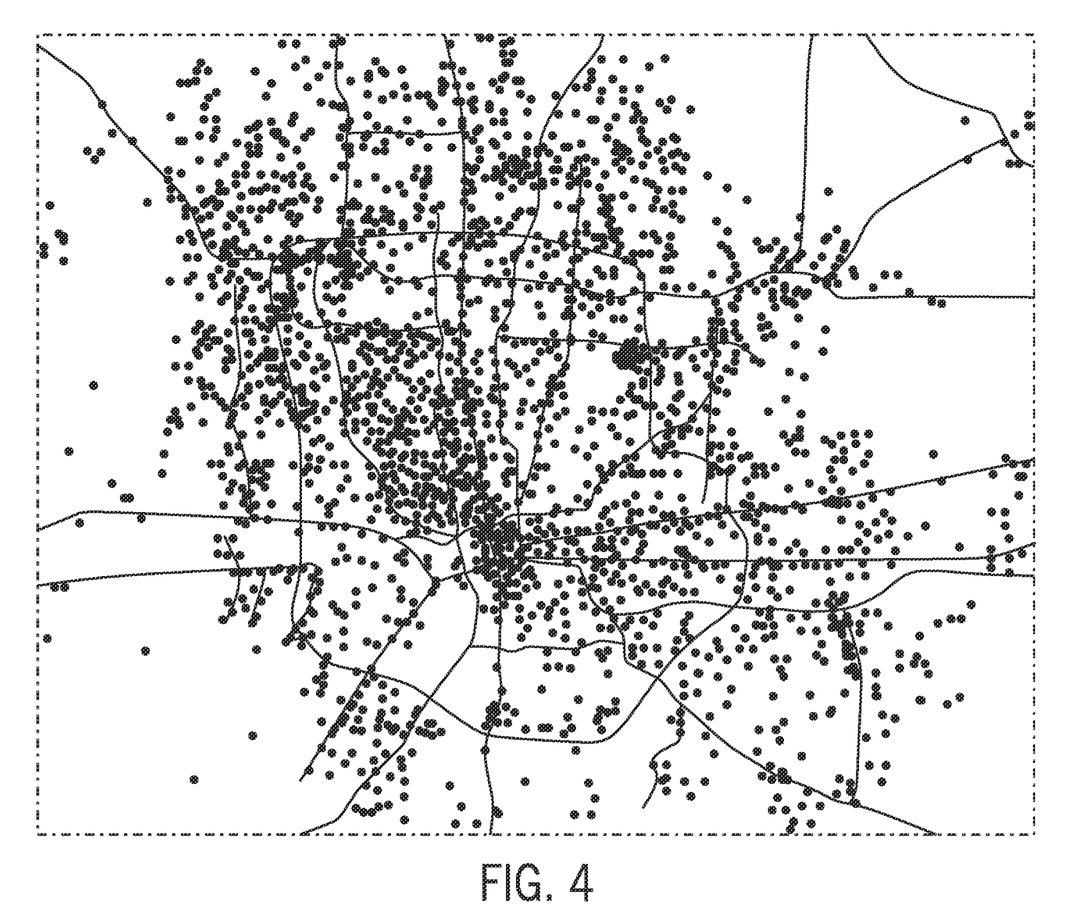
FIG. 4 is an illustrative example of raw destinations that may be determined for a particular metropolitan area of a city based on vehicle dynamics data and geo-location data collected over a predetermined period of time according to an exemplary embodiment of the present disclosure.

Upon retrieving the destination data and the dwell time data associated with a subset of the plurality of vehicles 102, the data acquisition module 202 may be configured analyze the data using a data wrangling technique. The data acquisition module 202 may analyze and aggregate the destination data and the dwell time data to determine a plurality of raw destinations that may be determined for a predetermined period of time. As shown in an illustrative example of FIG. 4, raw destinations may be determined for a particular metropolitan area of a city based on vehicle dynamics data and geo-location data collected over a predetermined period of time. As discussed below, the EV station optimization application 108 may further analyze the raw destinations to determine clusters of candidate locations that may include predetermined levels of traffic density patterns.

Referring again to the method 300 of FIG. 3, upon the completing of data acquisition and wrangling, the method 300 may proceed to block 304, wherein the method 300 may include identifying clusters of candidate locations. In an exemplary embodiment, upon determining raw destinations associated with a subset of the plurality of vehicles 102, the data acquisition module 202 may communicate respective data to the candidate clustering module 204 of the EV station optimization application 108. In one or more embodiments, the candidate clustering module 204 may be configured to complete unsupervised machine learning to output candidate locations as nodes within a fully connected graph structure to be further analyzed with respect to traffic patterns, rate of arrivals, event data, and the like.

The candidate clustering module 204 may implement DBSCAN since it is deterministic, interpretable, and scalable to large databases as it does not require every observation to reside in memory during computation. Additionally, DBSCAN may be utilized since clusters of arbitrary shapes may be generated without pre-trained subject matter knowledge regarding a number of substructures to be expected during pattern discovery. Additionally, DBSCAN may discriminate between observations that belong to a cluster from observations that belong to noise.

The discriminating operation to label noise makes DBSCAN adept and usable for the candidate clustering module 204 for clustering geo-spatial data. DBSCAN is operated with the following generalizations. An epsilon neighborhood, $EN_i$, of a point, i, is used as a set of all points in a database, D that are reachable from i by traversing a distance less than the supplied epsilon parameter. A generalization that is made is:

$$EN_i = \{j \in D | \text{distance}(i,j) \leq E\} \quad (1)$$

A directly density reachable intuition is used where a point i is density reachable from point j, if there exists a path, P, through the network starting at j that can land on i using only way points that are at each step, t+1, directly density reachable from the way point at t. A generalization that is made is:
If ∃P
such that, $$\forall P_t P_T$$

$$\text{directlyDensityReachable}(P_t, P_{t+1}) = 1 \quad (3)$$

where, $P_1 = j$ & $P_T = i$

A density connection intuition is used where a point i is density connected to point j, if i and j share at least 1 point, k, they are both density reachable from k. A generalization that is made is:
If ∃k
such that, $$\text{densityReachable}(k,i) = 1 \; \text{densityReachable}(k,j) = 1 \quad (4)$$

Determination of cluster and noise is made where a cluster C, is defined to be a subset of all observations, such that: If i is a member of a C and j is density reachable from i. Then j is also a member of that C. If i and j are both members of C then they are also density connected to each other. Noise is defined as a set of observations that do not satisfy the necessary conditions to belong in any C.

In an exemplary embodiment, the data structure associated with the raw destinations associated with a subset of the plurality of vehicles 102 that are located within a predetermined area are flattened into a two-dimensional array. The two-dimensional array may contain geo-spatial coordinates along with each encrypted vehicle's VIN and trip sequence identifiers. DBSCAN is instantiated with the aforementioned generalizations using a Haversine distance metric (e.g., great circle distance) to ensure that proximity calculations are completed with respect to an arc length in a geo-spatial system. In other words, the Haversine distance metric may include a distance (e.g., 200 meters) that two or more vehicles may be considered to be apart to be considered to be located at the same destination. This distance is utilized by the DBSCAN to determine the clusters of candidate locations. In particular, DBSCAN may be passed two dimensions from the array, latitude and longitude, and supplied with an epsilon parameter based on the Haversine distance metric. Accordingly, based on the utilization of DBSCAN, a vector of cluster labels may be output that identify dense demand clusters of candidate electric vehicle charging station locations.

Figure 5:
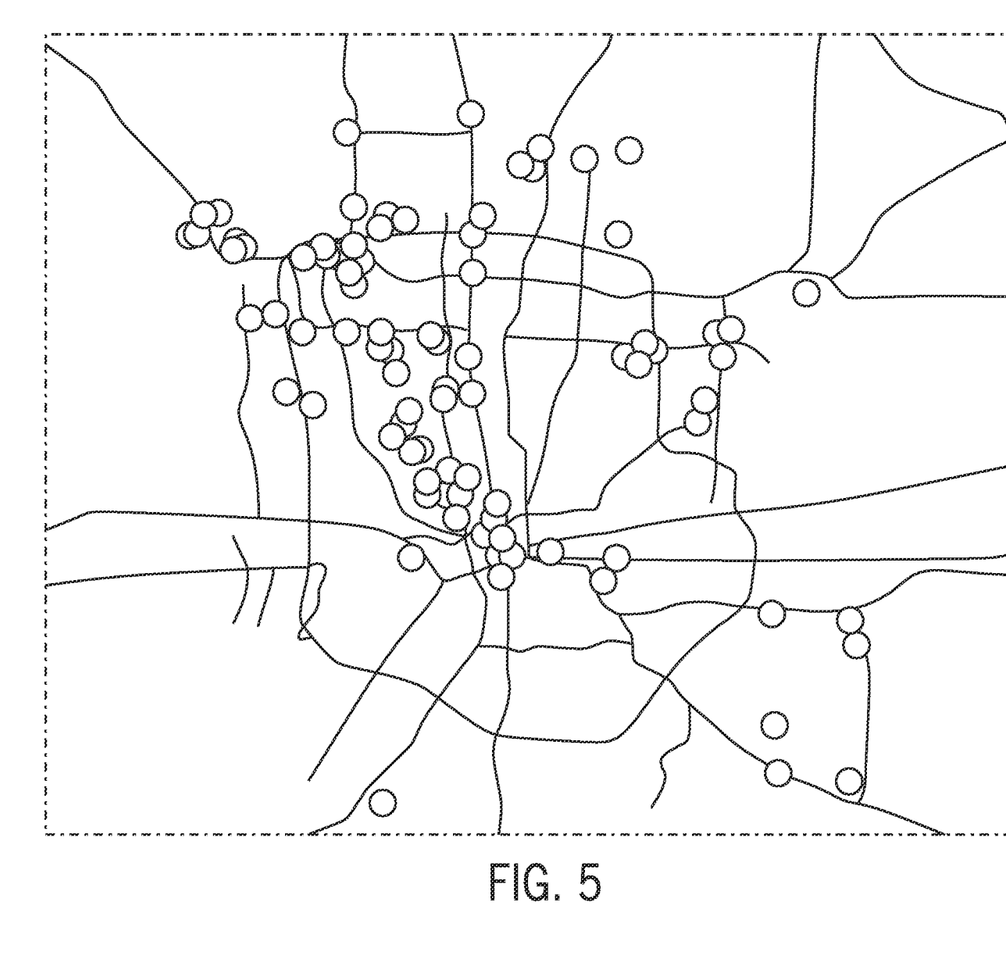
FIG. 5 is an illustrative example of clusters of candidate locations that may be determined and visualized according to an exemplary embodiment of the present disclosure.

As shown in an illustrative example of FIG. 5, clusters of candidate locations may be determined and visualized. In one configuration, the candidate clustering module 204 may be configured to communicate data pertaining to the clusters of candidate locations of the placement visualization module 208 upon the presentation of the HMI that includes optimal locations for stakeholders 110 to invest in and place electric vehicle charging stations. The HMI may be utilized by the stakeholders 110 to plot the candidate locations as shown in FIG. 5 (excluding noise) such that zooming in and zooming out of clusters may reveal more or less resolution regarding each cluster's makeup. Accordingly, one or more stakeholders 110 may be able to utilize a zooming function for granular resolution of each cluster of candidate locations.

Referring again to the method 300 of FIG. 3, upon identifying clusters of candidate locations, the method 300 may proceed to block 306, wherein the method 300 may include completing cluster feature engineering. In an exemplary embodiment, the candidate clustering module 204 may be configured to analyze the clusters of candidate locations to remove observations that have been assigned as noise. The candidate clustering module 204 may use the cluster labels as a grouping variable to engineer additional features that may provide attributes with respect to each cluster.

Cluster features that may include, but may not be limited to, dwell time, daily average inbound traffic and variance of daily average inbound traffic. The candidate clustering module 204 may utilize an assumption that the inbound traffic behavior exhibits traits of a Poisson process. In one configuration, the module 204 may evaluate the average dwell time as service rate (μ) and may apply a queueing theory to estimate utilization (ρ) of a cluster in the manner of a single server M/M/∞ model, ρ=λ/μ. These will be factors that linearly combine to make up the average electric vehicle driver utility ($u_i$) gained from the presence of a well located electric vehicle charging station which is factored by the aggregate destination demand attributes at that location.

With respect to the M/M/∞ model, M refers to a memoryless nature of a Markov process. The model notation implies that the arrivals are Poisson distributed. Additionally, it implies that the service rate is exponentially distributed, and the ∞ refers to the fact that there are infinite service rates since the candidate locations may be public locations at which there are no queues. For example, the service rate of the location is simply the experience of being at the location and may be inversely associated with the dwell time of the vehicles at the particular location.

The candidate clustering module 204 may thereby utilize the dwell time to distinguish arrival behavior between locations. This may provide an indication of average expected arrivals and the traffic density with respect to particular candidate locations during one or more periods of time. Stated differently, the candidate clustering module 204 may utilize dwell times since they may effectively represent the underlying nature of each respective location (e.g., gas stations would have high service rates thus low dwell times, whereas cinemas would have low service rates thus higher dwell times).

The candidate clustering module 204 may implement a diversity feature that represents the ratio of the unique vehicles that have visited a candidate location to the total number of visits to that candidate location. The diversity feature may be implemented to act as a dampening factor to the expected number of vehicles at the candidate location at any time. This feature is used since a functionality of the EV station optimization application 108 is to increase a consumer adoption of electric vehicle technology. The placement of each electric vehicle charging station may also act as a signal to latent electric vehicle buyers regarding infrastructure availability. The diversity feature may also be implemented to help trim further noise from the DBSCAN operation of all raw observations. For example, instances of small number of vehicles with frequent travel to a candidate location may be filtered as noise since such locations may indicate a residential location. The diversity operation may be defined as:

$$Diversity_c = \frac{\text{Num Unique } Visits_c}{\text{Num Absolute } Visits_c} \quad (6)$$

The utility of a given cluster may thereby be defined as:

$$u_C = L_C Diversity_C \quad (7)$$

The candidate clustering module 204 may pass the average location of each cluster through a function which calls a particular application programming interface and returns trip distance between clusters ($d_{ij}$). Accordingly, the candidate clustering module 204 may utilize the trip distance between clusters ($d_{ij}$) as a practical distance matrix to use as a constraint for determining optimal locations. In an exemplary embodiment, upon completing cluster engineering, the candidate clustering module 204 may communicate data pertaining the cluster engineering completed to the placement optimization module 206 of the EV station optimization application 108. The candidate clustering module 204 may output candidate locations as nodes within a fully connected graph structure. As discussed below, the placement optimization module 206 may be configured to complete placement optimization to determine optimal locations (e.g., n best locations) for placement of electric vehicle charging stations based on analysis of the nodes.

Referring again to the method 300 of FIG. 3, upon completing cluster feature engineering, the method 300 may proceed to block 308, wherein the method 300 may include performing selection optimization. In an exemplary embodiment, the placement optimization module 206 may complete placement selection optimization to remove noise and to ensure that the value of selected nodes is not entirely dependent on the sum of the individual utilities, but that there exists a network configuration value, such that, it's less valuable to select nodes bunched together, and less valuable to select nodes that are so far apart that the distances between charging stations become problematic relative to battery optimal electric vehicle range.

In some configurations, a cost constant may be included that serves as a place holder within the objective function formulation. Accordingly, if granular installation cost information is provided by one or more of the stakeholders 110, such information may be input into the objective function as a variable that is utilized to perform selection optimization. The linear optimization may be formulated as an objective function:

$$\text{Minimize}\{\Sigma cx_i - \Sigma u_i x_j\} \forall i \in \{1 \ldots |N|\} \quad (8)$$

with constraints:

$$\cdot i \in \{1 \ldots |N|\}$$

$$\Sigma cx_i \leq B$$

$$\text{Dispersion Constant} \leq \frac{\sum d_{ij} y_{ij}}{\sum y_{ij}} \quad (9)$$

$$\frac{\sum d_{ij} y_{ij}}{\sum y_{ij}} \leq \text{Compression Constant}$$

Where:
c=Cost to install the electric vehicle charging station, treated as constant here $x_i$=Boolean decision variable, indicating whether node i was selected or not.
$u_i$=Utility at node i, as defined in equation
N=The set of identified candidate locations (nodes)
B=The hypothetical budget of the PCS supplying party
$d_{ij}$=The driving distance between nodes i
j$y_{ij}$=Boolean decision variable, that equals 1, if both nodes i and j are selected.

In one embodiment, given that c is a constant, the objective function behaves as a ranking mechanism that selects as many candidate location nodes that the budget allows for. A dispersion constant is used and a constraint is set such that the average driving distance between any pair of nodes within the selected network is larger than the dispersion constant. For example, a distance of 15 km may be set, which may indicate a radius of an interstate beltway of a mid-size city. This constraint may thereby limit the selection of too many nodes clustered together. In an exemplary embodiment, upon performing selection optimization, the placement optimization module 206 may be configured to communicate data associated with the determined optimal locations to place (e.g., invest, build, operate, and maintain) electric vehicle charging stations based on likelihood of station utilization to the placement visualization module 208 of the EV station optimization application 108.

Referring again to the method 300 of FIG. 3, upon performing selection optimization, the method 300 may proceed to block 310, wherein the method 300 may include presenting a visualization of optimal locations for placement of electric vehicle charging stations. In one or more embodiments, upon receiving the determined optimal locations to place electric vehicle charging stations, the placement visualization module 208 may be configured to utilize the communication unit 126 of the external server 104 to communicate data pertaining to the presentation of the HMI that includes optimal locations for stakeholders 110 to invest in and place electric vehicle charging stations to one or more computing systems 128 through the internet cloud 130.

In one embodiment, the HMI may be accessible by stakeholders 110 through respective computing systems 128. As shown in an illustrative example of FIG. 6, the HMI 600 may provide a portable and interactive graphic interface that may be utilized to determine optimal locations 602 for placement of electric vehicle charging stations. The HMI 600 may also include candidate locations that may be analyzed by the stakeholders. With respect to FIG. 5 and FIG. 6, the HMI 600 may be manipulated by zooming in and zooming out of clusters and/or optimal locations 602 to reveal more or less resolution regarding each cluster's makeup and/or to reveal attributes associated with respective optimal locations.

Figure 6:
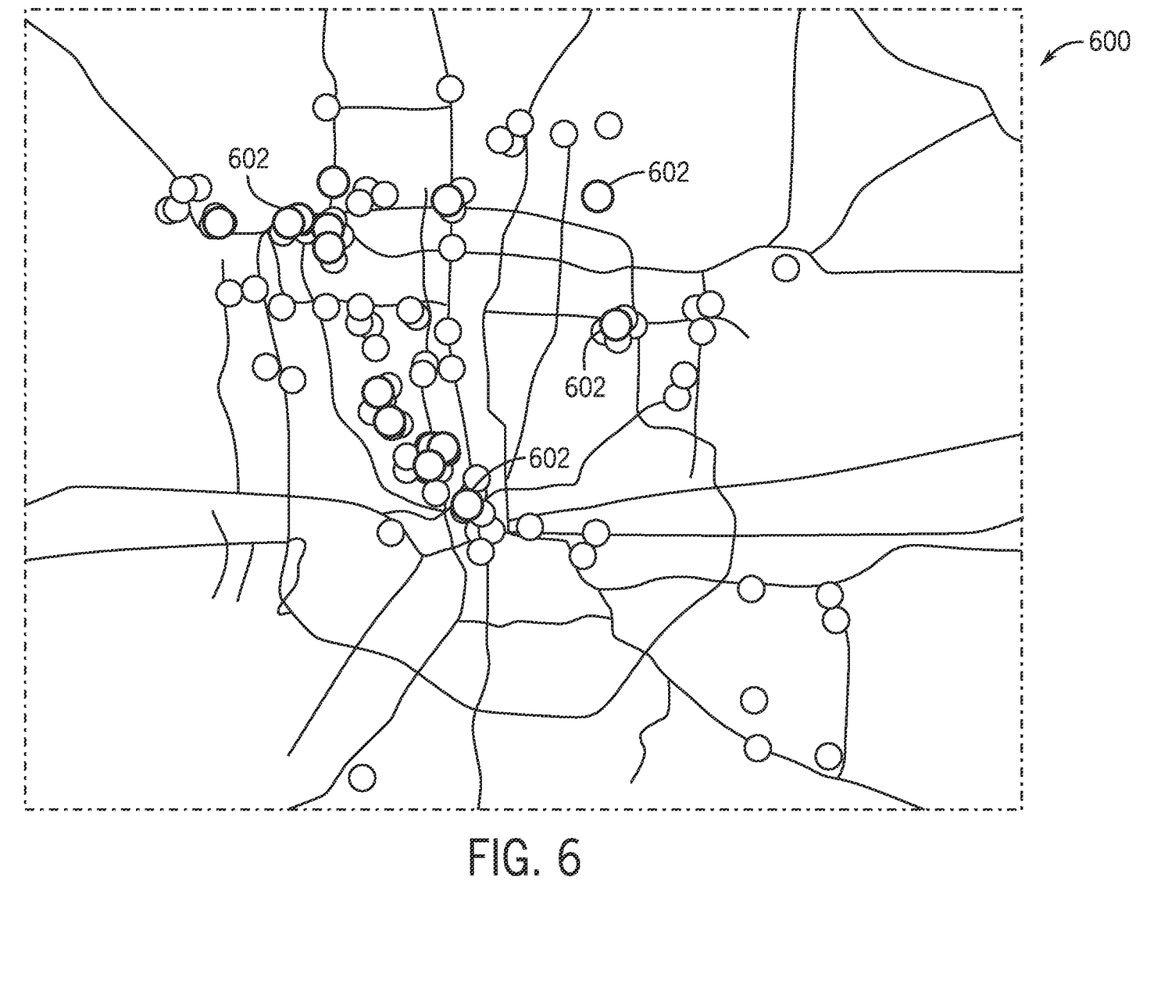
FIG. 6 is an illustrative example of a human machine interface that may provide a portable and interactive graphic interface that may be utilized to determine optimal locations for placement of electric vehicle charging stations according to an exemplary embodiment of the present disclosure.

Such attributes may pertain to the locations and surrounding areas, that may include, but may not be limited to, inbound traffic behavior, traffic patterns, demand timings, locality based demand response pricing schemes, local event descriptions, and the like. This functionality may thereby enhance consumer confidence with respect to the adoption of electric vehicle technology since the optimal locations that are determined for placement of electric vehicle charging stations may take into account a comfortable range for driver utility.

Figure 7:
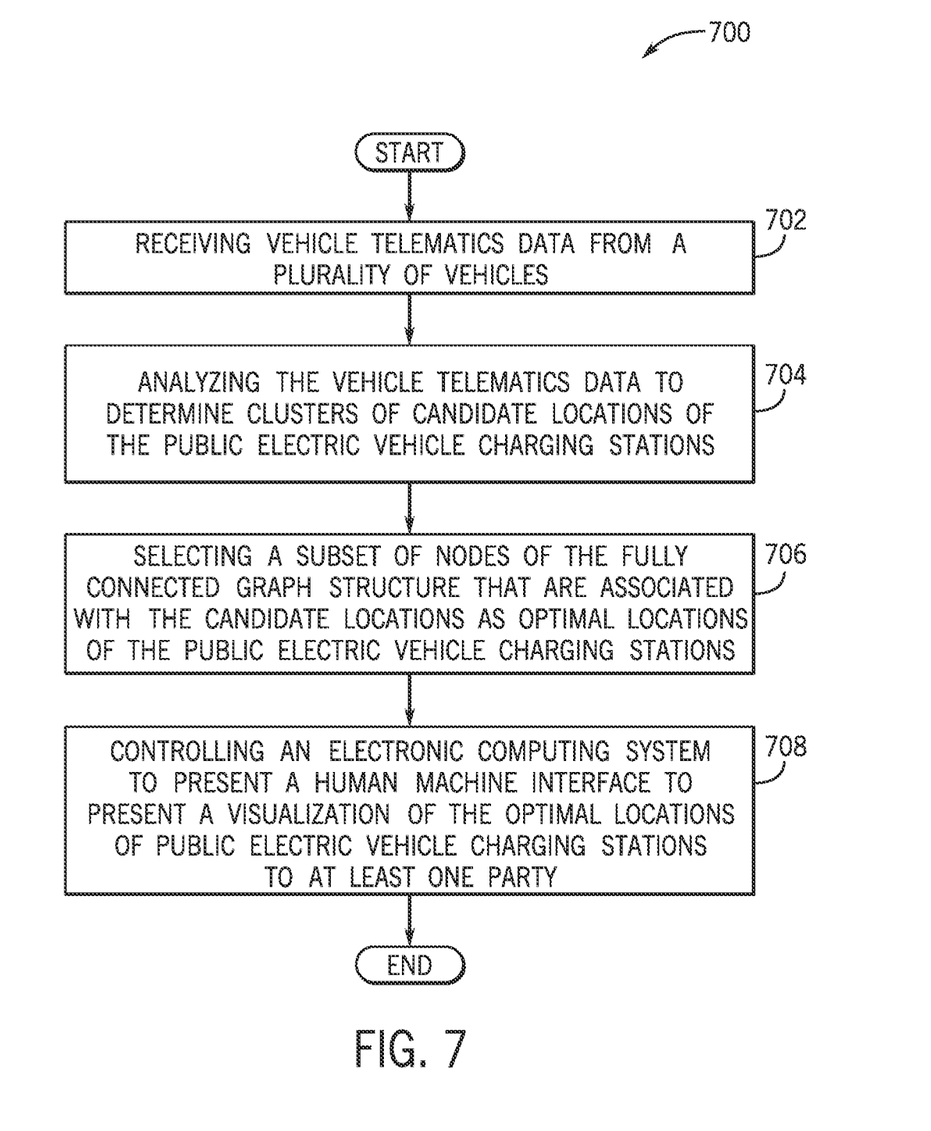
FIG. 7 is a process flow diagram of a method for placement optimization of public electric vehicle charging stations using telematics data according to an exemplary embodiment of the present disclosure.

FIG. 7 is a process flow diagram of a method 700 for placement optimization of public electric vehicle charging stations using telematics data according to an exemplary embodiment of the present disclosure. FIG. 7 will be described with reference to the components of FIG. 1, through it is to be appreciated that the method 700 of FIG. 7 may be used with additional and/or alternative system components. The method 700 may begin at block 702, wherein the method 700 may include receiving vehicle telematics data from a plurality of vehicles 102.

The method 700 may proceed to block 704, wherein the method 700 may include analyzing the vehicle telematics data to determine clusters of candidate locations of the public electric vehicle charging stations. In one embodiment, the candidate locations are output as nodes within a fully connected graph structure. The method 700 may proceed to block 706, wherein the method 700 may include selecting a subset of nodes of the fully connected graph structure that are associated with the candidate locations as optimal locations of the public electric vehicle charging stations. The method 700 may proceed to block 708, wherein the method 700 may include controlling an electronic computing system to present a human machine interface to present a visualization of the optimal locations of public electric vehicle charging stations to at least one party.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for placement optimization of public electric vehicle charging stations using telematics data comprising:

electronically receiving vehicle telematics data from a plurality of vehicles;

electronically analyzing the vehicle telematics data to determine clusters of candidate locations of the public electric vehicle charging stations, wherein a vector of cluster labels are output that identify dense demand clusters of the candidate locations, wherein the candidate locations are electronically determined based on an aggregated measure of distance from an identified demand location and traffic density patterns and are output as nodes within a fully connected graph structure;

electronically selecting a subset of nodes of the fully connected graph structure that are associated with the candidate locations as optimal locations of the public electric vehicle charging stations;

determining, via an EV station optimization application, geo-spatial locations of each of the plurality of vehicles at one or more points of time, thereby identify candidate locations of electric vehicle charging stations;

wirelessly communicating vehicle telematics data that includes vehicle dynamic data output by vehicle dynamic sensors and a geo-location data output by GPS sensors by each of the plurality of vehicles to via a server; and causing a processor to electronically control an electronic computing system to present a human machine interface to present a visualization of the optimal locations of the public electric vehicle charging stations to at least one party.

2. The computer-implemented method of claim 1, wherein the vehicle telematics data includes vehicle dynamics data and vehicle geo-location data, wherein the vehicle telematics data is analyzed to determine destinations and dwell time associated with the destinations of each of the plurality of vehicles.

3. The computer-implemented method of claim 2, wherein electronically analyzing the vehicle telematics data includes completing unsupervised machine learning by implementing a Density Based Spatial Clustering Applications with Noise algorithm (DBSCAN) to analyze the destinations and the dwell time associated with the destinations of each of the plurality of vehicles.

4. The computer-implemented method of claim 3, wherein a data structure associated with raw destinations is flattened into a two-dimensional array that contains geo-spatial coordinates associated with each vehicle of the plurality of vehicles.

5. The computer-implemented method of claim 4, wherein two dimensions from the two-dimensional array that include latitude and longitude are passed through the DBSCAN, wherein the DBSCAN is supplied with an epsilon parameter based on a Haversine distance metric.

6. The computer-implemented method of claim 5, wherein noise is determined with respect to candidate locations within clustered subsets and cluster feature engineering is executed to remove observations that are determined as the noise.

7. The computer-implemented method of claim 1, wherein electronically selecting the subset of nodes includes implementing a dispersion constant that is included as a distance measurement as a constraint with respect to the nodes that are associated with the candidate locations to ensure that an average driving distance between any pair of nodes is above the dispersion constant.

8. The computer-implemented method of claim 1, wherein electronically selecting the subset of nodes includes implementing a cost constraint that is associated with a cost to install the public electric vehicle charging stations, wherein the cost constraint is implemented with respect to the nodes that are associated with the candidate locations to ensure that nodes are selected accordingly to budgetary requirements of stakeholders.

9. A system for placement optimization of public electric vehicle charging stations using telematics data comprising:
a memory storing instructions when executed by a processor cause the processor to:
electronically receive vehicle telematics data from a plurality of vehicles;
electronically analyze the vehicle telematics data to determine clusters of candidate locations of the public electric vehicle charging stations, wherein a vector of cluster labels are output that identify dense demand clusters of the candidate locations, wherein the candidate locations are electronically determined based on an aggregated measure of distance from an identified demand location and traffic density patterns and are output as nodes within a fully connected graph structure;
electronically select a subset of nodes of the fully connected graph structure that are associated with the candidate locations as optimal locations of the public electric vehicle charging stations;
determine, via an EV station optimization application, geo-spatial locations of each of the plurality of vehicles at one or more points of time, thereby identify candidate locations of electric vehicle charging stations wirelessly communicate vehicle telematics data that includes vehicle dynamic data output by vehicle dynamic sensors and a geo-location data output by GPS sensors by each of the plurality of vehicles to via a server; and
cause the processor to electronically control an electronic computing system to present a human machine interface to present a visualization of the optimal locations of the public electric vehicle charging stations to at least one party.

10. The system of claim 9, wherein the vehicle telematics data includes vehicle dynamics data and vehicle geo-location data, wherein the vehicle telematics data is analyzed to determine destinations and dwell time associated with the destinations of each of the plurality of vehicles.

11. The system of claim 10, wherein electronically analyzing the vehicle telematics data includes completing unsupervised machine learning by implementing a Density Based Spatial Clustering Applications with Noise algorithm (DBSCAN) to analyze the destinations and the dwell time associated with the destinations of each of the plurality of vehicles.

12. The system of claim 11, wherein a data structure associated with raw destinations is flattened into a two-dimensional array that contains geo-spatial coordinates associated with each vehicle of the plurality of vehicles.

13. The system of claim 12, wherein two dimensions from the two-dimensional array that include latitude and longitude are passed through the DBSCAN, wherein the DBSCAN is supplied with an epsilon parameter based on a Haversine distance metric.

14. The system of claim 13, wherein noise is determined with respect to candidate locations within clustered subsets and cluster feature engineering is executed to remove observations that are determined as the noise.

15. The system of claim 9, wherein electronically selecting the subset of nodes includes implementing a dispersion constant that is included as a distance measurement as a constraint with respect to the nodes that are associated with the candidate locations to ensure that an average driving distance between any pair of nodes is above the dispersion constant.

16. The system of claim 9, wherein electronically selecting the subset of nodes includes implementing a cost constraint that is associated with a cost to install the public electric vehicle charging stations, wherein the cost constraint is implemented with respect to the nodes that are associated with the candidate locations to ensure that nodes are selected accordingly to budgetary requirements of stakeholders.

17. A non-transitory computer readable storage medium storing instructions that when executed by a computer, which includes a processor perform a method, the method comprising:
electronically receiving vehicle telematics data from a plurality of vehicles;
electronically analyzing the vehicle telematics data to determine clusters of candidate locations of public electric vehicle charging stations, wherein a vector of cluster labels are output that identify dense demand clusters of the candidate locations, wherein the candidate locations are electronically determined based on an aggregated measure of distance from an identified demand location and traffic density patterns and are output as nodes within a fully connected graph structure;

electronically selecting a subset of nodes of the fully connected graph structure that are associated with the candidate locations as optimal locations of the public electric vehicle charging stations;

determining, via an EV station optimization application, geo-spatial locations of each of the plurality of vehicles at one or more points of time, thereby identify candidate locations of electric vehicle charging stations;

wirelessly communicating vehicle telematics data that includes vehicle dynamic data output by vehicle dynamic sensors and a geo-location data output by GPS sensors by each of the plurality of vehicles to via a server; and causing the processor to electronically control an electronic computing system to present a human machine interface to present a visualization of the optimal locations of the public electric vehicle charging stations to at least one party.

18. The non-transitory computer readable storage medium of claim 17, wherein electronically selecting the subset of nodes includes implementing a dispersion constant that is included as a distance measurement as a constraint with respect to the nodes that are associated with the candidate locations to ensure that an average driving distance between any pair of nodes is above the dispersion constant.

* * * * *